(12) United States Patent
Pfeiffer et al.

(10) Patent No.: US 7,440,169 B2
(45) Date of Patent: Oct. 21, 2008

(54) METHOD FOR AMPLIFYING A TIME-VARYING OPTICAL SIGNAL AND OPTICAL AMPLIFICATION UNIT

(75) Inventors: Thomas Pfeiffer, Stuttgart (DE); Peter Vetter, Antwerpen (BE); Ingrid Van De Voorde, Wolvertem (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/526,566

(22) Filed: Sep. 26, 2006

(65) Prior Publication Data

US 2007/0189767 A1  Aug. 16, 2007

(30) Foreign Application Priority Data

Sep. 26, 2005  (EP) ................ 05292008.9

(51) Int. Cl.
*H01S 4/00* (2006.01)
*H04B 10/12* (2006.01)

(52) U.S. Cl. ............. 359/337.13; 398/79; 398/82

(58) Field of Classification Search ........... 359/337.13; 398/79, 82
See application file for complete search history.

(56) References Cited

U.S. PATENT DOCUMENTS

| | | | | |
|---|---|---|---|---|
| 5,491,575 A | * | 2/1996 | Neidlinger et al. | ......... 398/100 |
| 5,589,967 A | * | 12/1996 | Auffret | ........... 398/54 |
| 5,657,153 A | * | 8/1997 | Endriz et al. | ............. 359/341.1 |
| 6,259,553 B1 | * | 7/2001 | Kinoshita | ............ 359/337 |
| 6,825,973 B1 | | 11/2004 | Puc et al. | |
| 2002/0135867 A1 | | 9/2002 | Jackel | |

FOREIGN PATENT DOCUMENTS

JP   10336117 A  * 12/1998

OTHER PUBLICATIONS

J. Jacketl et al "All-optical burst support for optical packets", Optical Communication, 2001. ECOC '01, 27th European Conference on Sep. 30-Oct. 4, 2001, pp. 368-369, XP010583424'.
An V. Tran et al, EDFA Transient Control Based on Envelope Dectection for Optical Burst Switched Networks, IEEE Photonics Technology Letters, vol. 17, No. 1, Jan. 2005, pp.226-228.

* cited by examiner

*Primary Examiner*—Eric Bolda
(74) *Attorney, Agent, or Firm*—Sughrue Mion, PLLC

(57) ABSTRACT

A method for amplifying a time-varying optical signal comprising the steps of: generating an auxiliary optical signal the amplitude of which is chosen to be complementary to at least the envelope of the amplitude of the optical signal, superimposing the auxiliary optical signal to the optical signal resulting in a compound signal having an amplitude which is constant at least on average, amplifying the compound signal, and removing the amplified auxiliary optical signal from the amplified compound signal; as well as an optical amplification unit for carrying out the method.

10 Claims, 3 Drawing Sheets

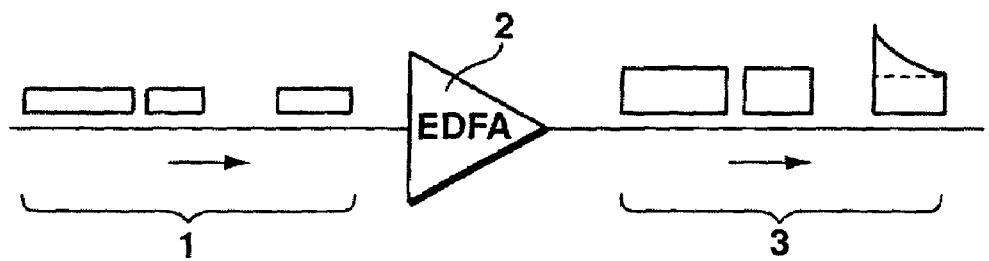
PRIOR ART Fig. 1a
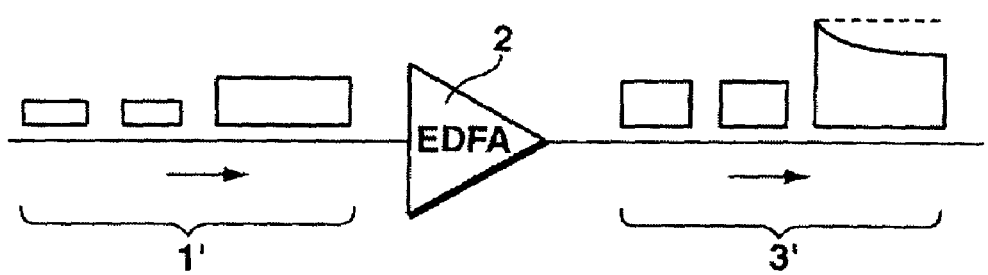
PRIOR ART Fig. 1b
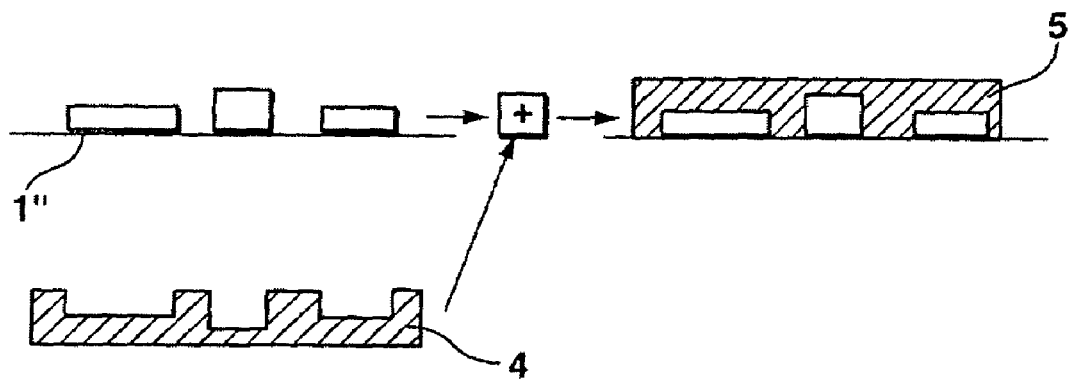
Fig. 2

METHOD FOR AMPLIFYING A TIME-VARYING OPTICAL SIGNAL AND OPTICAL AMPLIFICATION UNIT

BACKGROUND OF THE INVENTION

The invention is based on a priority application EP 05292008.9 which is hereby incorporated by reference.

The invention relates to a method for amplifying a time-varying optical signal, in particular a burst-mode optical signal, and an optical amplification unit construed for implementing the method.

Burst-mode operation of optical systems will become more important with the widespread deployment of passive optical networks (PONs). The next generation of PONs is foreseen to involve optical amplification. Also, for metro and core networks there have been system proposals that rely on bursty optical signal transmission. However, amplification of such time-varying optical signals, in particular burst-mode signals, presents some difficulties. Namely, when amplifying a burst-mode optical signal in an optical amplifier such as an EDFA (erbium-doped fiber amplifier), the input power to the amplifier varies depending on such parameters as burst length, length of inter-burst gap, consecutive identical digits (CIDs), and amplitude variations between the bursts, the input power variation resulting in amplification of the signal with non-constant gain over time. Such gain variations may not only cause amplification of subsequent bursts with a different gain, but may also lead to gain variations in an individual burst, so-called transients, as described below.

FIG. 1a shows a burst-mode optical signal 1 with three consecutive bursts having identical amplitude and being applied to the input of a conventional EDFA 2. The resulting amplified signal 3 is not amplified properly, i.e. with constant gain, by the EDFA 2, as the third of the amplified bursts shows a gain transient, i.e. it starts with a higher amplitude than the preceding bursts, which decreases slowly to the amplitude of the preceding bursts (dashed line), the transient being caused by the long inter-burst gap between the second and third burst.

Likewise, FIG. 1b shows a further burst-mode optical signal 1' with three bursts having constant inter-burst length, the third of which being a strong burst, i.e. having an amplitude which is much larger than that of the preceding bursts. After amplification in the EDFA 2, the strong burst of the amplified signal 3' first presents the nominal amplitude which is expected for amplification with constant gain (dashed line), but afterwards shows a transient, i.e. decreases to an unwanted lower amplification level.

The unequal amplification as described in connection with FIG. 1a and FIG. 1b is particularly strong when several EDFAs 2 are concatenated, which will result in difficulties in the treatment of these signals being input to a receiver, in particular when transients are present, such that the signal gain varies over the duration of one and the same burst. Such transients require threshold adjustments of the receiver during a burst, and the large optical power spikes of the transients may even result in damaging of optical components of the receiver (photodiodes, component facets).

For keeping constant gain when amplifying time-varying signals, different solutions have been proposed in the state of the art. One such solution consists in performing gain clamping either by optical feedback (using a ring laser) or by injecting a strong idle signal of a different wavelength into the EDFA. However, gain and output power in a ring laser set-up are subject to relaxation oscillations (in the kHz range) and dissipate the major part of the energy stored in the EDFA, as is the case with an idle signal. A further solution described in the art is active control of the optical pump power level after detecting the optical input (and output) power levels, yet gain control via pump power is an indirect method that involves energy transfer dynamics that in turn depend on external parameters like pump and signal power, wavelength etc.

SUMMARY OF THE INVENTION

It is the object of the invention to realize amplification of a time-varying optical signal while avoiding gain variations (transients) of individual bursts and at the same time to overcome the problems of the state of the art described above.

This object is achieved by a method for amplifying a time-varying optical signal comprising the steps of: generating an auxiliary optical signal, the amplitude of which is chosen to be complementary to at least the envelope of the amplitude of the optical signal, superimposing the auxiliary optical signal to the optical signal resulting in a compound signal having an amplitude which is constant at least on average, amplifying the compound signal, and removing the amplified auxiliary optical signal from the amplified compound signal.

This object is further achieved by an optical amplification unit for amplifying a time-varying optical signal, comprising: generating means for generating an auxiliary optical signal the amplitude of which is chosen to be complementary to at least the envelope of the amplitude of the optical signal, superimposing means for superimposing the auxiliary optical signal to the optical signal resulting in a compound signal having an amplitude which is constant at least on average, amplification means for amplifying the compound signal, and removing means for removing the amplified auxiliary optical signal from the amplified compound signal.

This object is further achieved by a passive optical network with at least one optical amplification unit for amplifying a time-varying optical signal, wherein the amplification means is arranged between at least one optical network terminal and an optical line termination, and wherein the generation means is arranged at the location of the optical line termination or at the location of one of the optical network terminals.

This object is further achieved by an optical repeater with an optical amplification unit for amplifying a time-varying optical signal.

The process of generating and superimposing an auxiliary optical signal to the time-varying optical signal to be amplified is best described in connection with FIG. 2, showing a burst-mode optical signal 1" having three bursts, each of which varies at a bit level (i.e. typically at a timescale of 1 to 100 nanoseconds), but has a constant overall amplitude. FIG. 2 also shows an auxiliary optical signal 4, the amplitude of which may be chosen to be complementary to the optical signal 1", which means that the signal amplitude of the auxiliary signal is defined by subtracting the time-varying amplitude of the optical signal from a signal having constant amplitude. This procedure results in a compound signal 5 with constant amplitude at the bit timescale after superposition (addition). Alternatively, the amplitude of the auxiliary signal 4 may be chosen to be complementary to the envelope of the bursts of the optical signal 1" only. In this case, the complementary signal 5 resulting from the superposition is constant on average, i.e. at the timescale of the bursts, but may vary on the bit timescale due to the variations of the optical signal 1" at the bit level which are not compensated for. In either case, the compound signal 5 has constant amplitude—hence constant power—at least on the time-scale of the bursts ranging typically from 1 to 100 microseconds.

For the compound signal 5 having constant power over time (i.e. being continuous mode), amplification with constant gain can be easily achieved in a conventional EDFA without wasting an undue amount of optical output power. The auxiliary optical signal 4 can either be produced by a laser generator using information about the optical signal produced in an additional step of measuring the amplitude of the time-varying optical signal, by branching-off part of the optical signal and transforming it to an auxiliary signal, or, in the case of a burst-mode signal in a PON, may be provided by other means, as will be described in greater detail below.

In a preferred variant, the optical signal is a burst-mode signal and the step of generating the auxiliary optical signal comprises choosing the envelope of the auxiliary optical signal to be complementary to the envelope of the bursts of the optical signal. As described above, in this variant it is only necessary to produce an auxiliary signal having a complementary amplitude on the timescale of the envelope of the bursts, i.e. on a 1 to 100 μsec timescale, not on the bit timescale. In this way, the burst-mode optical signal is transformed to a continuous-mode signal with little expense (at least on a time scale that is given by characteristic EDFA time constants, i.e. there is no significant intensity modulation on time scales of 1 to 100 μsec and above).

In a highly preferred variant, the optical signal has a first wavelength, the auxiliary optical signal has a second wavelength being different from the first wavelength, and the step of superimposing the auxiliary optical signal is carried out by multiplexing. By choosing different wavelengths of the auxiliary signal and the time-varying optical signal, removal of the auxiliary optical signal from the compound signal may be easily performed.

In an advantageous variant, the modulus of the difference between the second and first wavelength relative to the first wavelength is chosen to be smaller than 1%. By choosing the first and second wavelength close to one another, the amplification gain of both signals is comparable, resulting in an amplified compound signal with constant amplitude.

In a highly preferred variant of the inventive method, the step of removing the amplified auxiliary optical signal is carried out by filtering or de-multiplexing. By using an (optical) block filter or a notch filter or by de-multiplexing, the auxiliary optical signal may be efficiently removed from the amplified compound signal when both have different wavelengths. Alternately, it is also possible to use an auxiliary signal having the same wavelength as the optical signal and to remove (subtract) the auxiliary signal from the compound signal by means of an electrical high pass filter after optical-electrical conversion in a receiver. This is possible in case that the auxiliary signal varies on a timescale of the envelope of the bursts (i.e. at a timescale of 1 to 100 microseconds), whereas the original signal varies at the bit level (i.e. typically 1 to 100 nanoseconds).

The invention is also realized in an optical amplification unit for amplifying a time-varying optical signal, in particular operable to perform the method as described above, comprising: generating means for generating an auxiliary optical signal the amplitude of which is chosen to be complementary to at least the envelope of the amplitude of the optical signal, superimposing means for superimposing the auxiliary optical signal to the optical signal resulting in a compound signal having an amplitude which is constant at least on average, amplification means for amplifying the compound signal, and removing means for removing the amplified auxiliary optical signal from the amplified compound signal. Advantageously, the generating means comprise a laser with a wavelength being different from the wavelength of the optical signal and the superimposing means are realized as a multiplexer. The removing means may be realized as a de-multiplexer or as a filter.

In an advantageous embodiment, the optical amplification unit comprises an optical signal smoothing unit arranged in the path of the optical signal before the amplification means integrating the generating means and the superimposing means. In this way, the generation of the compound signal may be performed locally. The smoothing unit may further comprise measuring means for measuring the amplitude of the optical signal. Alternatively, the auxiliary signal may be generated in the smoothing unit by extracting part of the optical signal and generating the complementary amplitude of the auxiliary signal from the extracted part by a suitable transformation (subtraction from a constant signal).

In a highly preferred embodiment, the amplification means is an Erbium-doped fiber amplifier. Due to the long time constants involved in the EDFA gain dynamics the generation of the auxiliary signal waveform does not have to match perfectly with the input signal at the burst edges. The optical amplification unit is also not subject to control loop time constants in the EDFA.

The invention is also realized in a passive optical network with at least one amplification unit as described above, wherein the amplification means is arranged between at least one optical network terminal (ONT) and an optical line termination (OLT), and wherein the generation means is arranged at the location of the optical line termination or at the location of one of the optical network terminals. The OLT contains information about the amplitude of the burst-mode optical signal, as it transmits downstream signals for requesting such signals from the ONTs in upstream. Therefore, in a passive optical network (PON) upstream the measuring of the input optical signal timing and level can be replaced by taking advantage of the knowledge of the OLT about bursts transmitted from the ONTs in upstream. The auxiliary signals may then be generated at the OLT and be transmitted towards the optical amplifier location, more precisely to the superimposing means. Alternatively, the auxiliary signal could also be generated by a dedicated ONT of which the output power level can be set and transmitted in the upstream. The ONT then has the conventional control electronics to interpret downstream grants. In this case, the auxiliary signal may be a non-modulated burst (i.e. no data modulation, but with constant power level). This direct current (DC) can be filtered out in the electronic circuitry of the burst-mode receiver at the OLT.

The invention is further realized in an optical repeater with an optical amplification unit as described above. Optical repeaters located in a transmission line of the optical signal and provided with the inventive optical amplification unit may be used for constant-gain amplification of a time-varying optical signal, thus simplifying the operation of a receiver placed at the end of the transmission line.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

BRIEF DESCRIPTION OF THE DRAWINGS

The invention is shown in the drawing.

FIGS. 1a, b show amplification of a burst-mode optical signal with non-constant inter-burst gap and amplitude, respectively, leading to transients in the amplified signals, FIG. 2 shows the superposition of an auxiliary optical signal to a burst-mode optical signal resulting in a compound signal with constant overall amplitude.

DETAILED DESCRIPTION OF THE DRAWINGS

Figure 3:
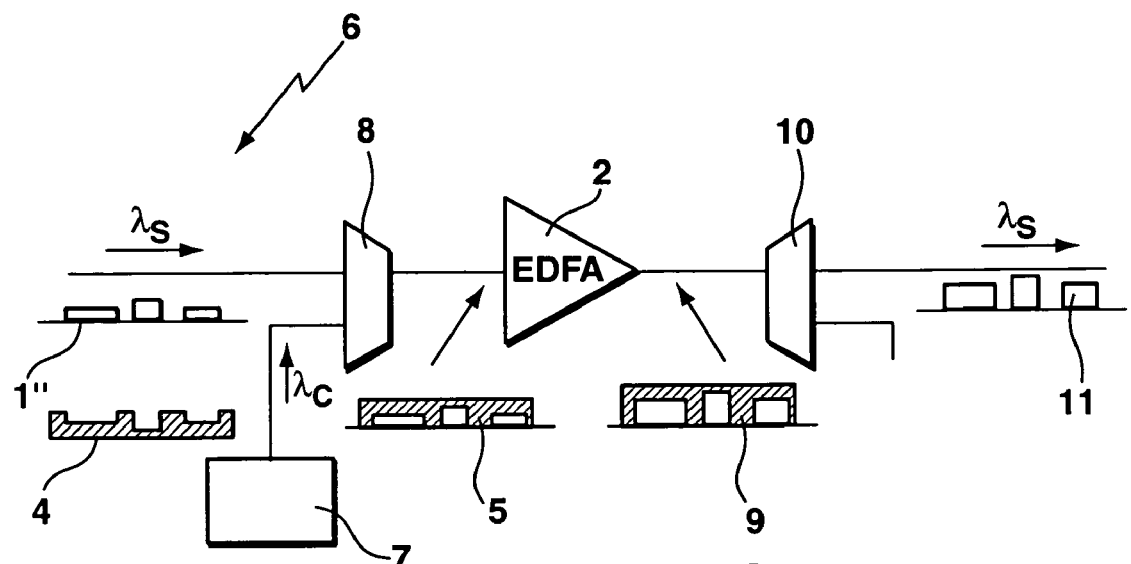
FIG. 3 shows a first embodiment of the inventive optical amplification unit.

FIG. 3 shows an optical amplification unit 6 for amplifying the time-varying burst-mode optical signal 1" shown in FIG. 2. The optical signal 1" has a first wavelength $\lambda_s$. The unit 6 comprises the standard EDFA 2 of FIG. 1 as an amplification means. For generating an amplification of the burst-mode optical signal 1" with constant gain over time, the burst-mode signal 1" has to be transformed to a continuous-mode signal which is done as described above in connection with FIG. 2 by addition of the auxiliary signal 4 to the burst-mode signal 1" thus generating the compound signal 5 with constant amplitude at least on the timescale of the bursts (i.e. 1 to 100 microseconds).

For later removal of the auxiliary signal 4 from the burst-mode signal 1", the former is generated having a second wavelength $\lambda_c$ which is detuned with respect to the first wavelength $\lambda_s$ of the optical signal 1" in a complementary signal generator 7 using a laser (not shown). The modulus of the difference between the first and second wavelengths $|\lambda_s - \lambda_c|$ related to the first wavelength $\lambda_s$, i.e. $|\lambda_s - \lambda_c|/\lambda_s$, is chosen to be below 1%. Both wavelengths being close to one another, the gain of the auxiliary signal 4 is comparable to that of the optical signal 1".

For generating the auxiliary signal 4 with an envelope of bursts being complementary to the envelope of the bursts of the burst-mode signal 1", the signal generator 7 is connected to measuring means (not shown) for measuring the envelope of the bursts of the optical signal 1". The auxiliary signal 4 thus generated is then added to the burst-mode signal 1" in a multiplexer 8 serving as a superimposing means. The resulting compound signal 5 is then amplified with constant gain in the EDFA 2 producing an amplified compound signal 9 with constant, increased amplitude. The amplified auxiliary signal is then removed from the amplified compound signal 9 in a demultiplexer 10, such that a the output of the multiplexer only the amplified burst-mode signal 11 is retained which corresponds to the burst-mode signal 1" amplified with a constant gain. The multiplexer 8 and the signal generator 7 may be implemented in a common smoothing unit (not shown) arranged before the EDFA 2. The smoothing unit together with the EDFA 2 and the demultiplexer 10 are conveniently integrated in an optical repeater for performing local amplification of the optical signal 1" with constant gain.

Figure 4:
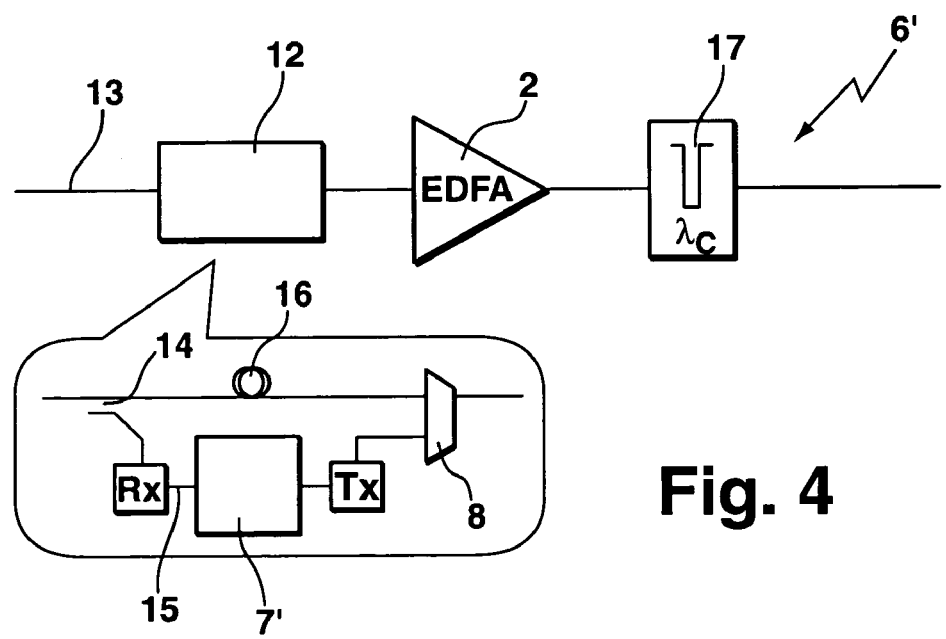
FIG. 4 shows a second embodiment of the optical amplification unit extracting part of the optical signal to be amplified for local generation of the auxiliary signal.

In FIG. 4, a modified realization of the optical amplification unit 6' with a signal smoothing unit 12 which is arranged in the path 13 of the optical signal before the EDFA 2 is represented. The smoothing unit 12 comprises a tap coupler 14 for extracting part of the optical signal (not shown) from the signal path 13 to an auxiliary signal generation path 15. The extracted part of the optical signal at a receiver Rx is then converted to the auxiliary optical signal at the second wavelength $\lambda_c$ by a transmitter Tx having a complementary amplitude which has been generated by generating means 7'. The auxiliary optical signal at the output of the transmitter Tx is then provided as an input to the multiplexer 8 serving as a superimposing means in the way described above. As processing of the extracted part of the optical signal causes some delay of the auxiliary signal relative to the optical signal, an optical fiber loop is added to the path of the optical signal 14 as a delay compensation means 16. In this way, the signals in the path 13 of the optical signal and in the auxiliary signal generation path 15 are synchronized when superimposed at the location of the multiplexer 8. The removal of the auxiliary optical signal is performed in the optical amplification unit 6" by means of a notch filter 17. Note that the optical amplification unit 6" may also serve as an optical repeater.

Figure 5:
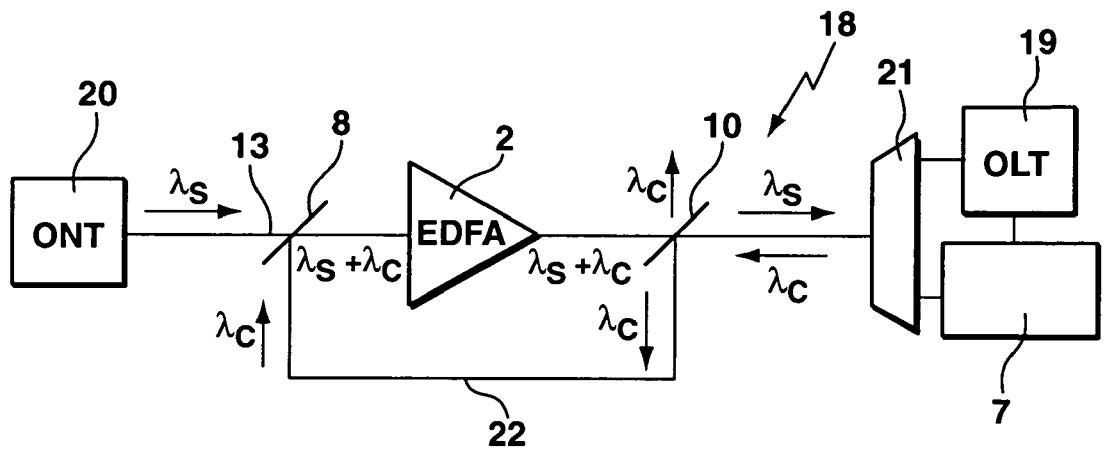
FIG. 5 shows a passive optical network with an optical amplification unit with remote generation of the auxiliary signal in an optical line termination.

With respect now to FIG. 5, a passive optical network (PON) 18 is shown comprising a optical amplification unit with distributed components having a similar construction as the one shown in FIG. 3, the main difference being that the signal generator 7 for generating the auxiliary optical signal is not located in the path of the optical signal 13 before the EDFA 2, but at a remote location behind the EDFA 2, more precisely in an optical line termination (OLT) 19 of the network 18. The OLT 19 is connected to a plurality (typically several tens to hundreds) of optical network terminals (ONT), only one of which (20) is represented in FIG. 5 for the sake of simplicity. A burst-mode optical signal with wavelength $\lambda_s$ is generated in the ONT 20 and is then amplified in the EDFA 2 with a constant gain by adding and removing an auxiliary optical signal in a multiplexer 8 and a de-multiplexer 9, respectively, in the way described in connection with FIG. 3.

As explained above, the auxiliary signal with the second wavelength $\lambda_C$ is generated at the location of the OLT 19 and is added to the optical signal at the input of the latter in a further multiplexer 21. The auxiliary signal is then transmitted to the location of the de-multiplexer 9 along the transmission path of the optical signal in a direction of propagation being opposite to that of the amplified optical signal with wavelength $\lambda_S$. At the location of the de-multiplexer 9, the auxiliary signal is extracted and bypasses the EDFA 2 in a short-circuit 21 leading to the location of the multiplexer 8 where it is superimposed to the optical signal in the usual way.

Figure 6:
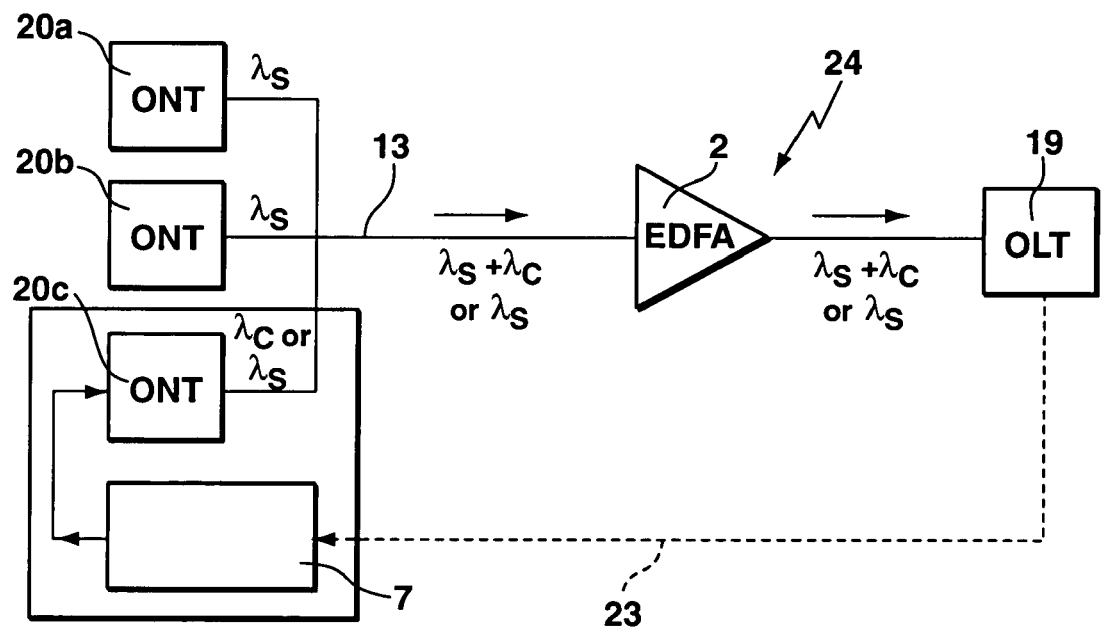
FIG. 6 shows a passive optical network with an optical amplification unit with remote generation of the auxiliary signal in an optical network terminal.

FIG. 6 shows another passive optical network 24 having a plurality of optical network terminations, three of which (20a to 20c) are shown, and which differs from the optical network 18 of FIG. 5 in that the auxiliary optical signal is generated in a generating means 7 at the location of the ONT 20c which is dedicated for this purpose. The information present in the OLT 19 about the burst-mode signals of the upstream path 13 is transferred to the location of the ONT 20c in a downstream channel 23. The ONT 20c may transfer the signal from the generator 7 to the signal path 13 either at a wavelength $\lambda_C$ being different from the wavelength $\lambda_S$ (removing the amplified auxiliary signal in a suitable removing means, e.g. a de-multiplexer, after the EDFA 2 (not shown)), or at the signal wavelength $\lambda_S$ itself. In the latter case, the auxiliary signal may be a non-modulated burst (i.e. no data modulation, but with constant power level). The auxiliary signal then varies on a time scale of the envelope of the bursts (i.e. from 1 to 100 microseconds), while the optical signal varies at a bit level (i.e. typically in the order of 1 to 100 nanoseconds). Due to the different timescales of the modulation of the signals, it is possible to subtract the auxiliary signal from the compound signal by means of an electrical high pass filter as a removing means in the OLT 19 (not shown). In such a way, the use of different wavelengths for the auxiliary signal and the optical signal can be avoided.

The remote generation of the auxiliary signal not involving measuring of the input optical signal timing and level is only possible in a passive optical network (PON) by taking advantage of the knowledge of the OLT 19 about bursts transmitted from the ONTs 20 in upstream. The auxiliary signals can thus be generated at the OLT 19 or the ONT 20c and transmitted towards the optical amplifier location.

In summary, the inventive amplification method and unit allow for amplification of a time-dependent, in particular burst-mode optical signal with constant gain, in particular avoiding transients, when using any conventional EDFA without wasting an undue amount of optical output power, not being subject to control loop time constants in the EDFA, and, by exploiting the long time constants involved in the EDFA gain dynamics, the generation of the auxiliary signal waveform does not have to match perfectly with the input signal at the burst edges. Note, however, that although the application of the amplification method and unit have been described above in connection with burst-mode signals only, they allow for amplification of any kind of time-varying signal with constant gain. Also, the invention is not limited to the use of EDFAs, but may advantageously be combined with other kinds of optical amplifiers, in particular amplifiers doped with other rare-earth elements such as neodymium, praseodymium, thulium etc.

The invention claimed is:

1. A method for amplifying a time-varying optical signal, comprising:
    generating an auxiliary optical signal having an amplitude which is complementary to at least the envelope of the amplitude of the optical signal,
    superimposing the auxiliary optical signal to the optical signal resulting in a compound signal having an amplitude which is constant at least on average,
    amplifying the compound signal, and
    removing the amplified auxiliary optical signal from the amplified compound signal;
    wherein the step of superimposing results in the optical signal and the auxiliary optical signal overlapping in time.

2. The method according to claim 1, wherein the optical signal is a burst-mode signal and the step of generating the auxiliary optical signal comprises choosing the amplitude of the auxiliary optical signal to be complementary to the envelope of the bursts of the optical signal.

3. The method according to claim 1, wherein the optical signal has a first wavelength, the auxiliary optical signal has a second wavelength being different from the first wavelength, and the step of superimposing the auxiliary optical signal is carried out by multiplexing.

4. The method according to claim 3, wherein the modulus of the difference between the second and first wavelength relative to the first wavelength is chosen to be smaller than 1%.

5. The method according to claim 1, wherein the step of removing the auxiliary optical signal is carried out by optical filtering or de-multiplexing.

6. An optical amplification unit for amplifying a time-varying optical signal, in particular for carrying out the method according to claim 1, comprising:
    generating means for generating an auxiliary optical signal the amplitude of which is chosen to be complementary to at least the envelope of the amplitude of the optical signal,
    superimposing means for superimposing the auxiliary optical signal to the optical signal resulting in a compound signal having an amplitude which is constant at least on average,
    amplification means for amplifying the compound signal, and
    removing means for removing the amplified auxiliary optical signal from the amplified compound signal;
    wherein the superimposing means superimposes the auxiliary optical signal to the optical signal such that the auxiliary optical signal and the optical signal overlap in time.

7. The optical amplification unit according to claim 6, wherein a optical signal smoothing unit arranged in the path of the optical signal before the amplification means integrates the generating means and the superimposing means.

8. The optical amplification unit according to claim 6, wherein the amplification means is an Erbium-doped fiber amplifier.

9. A passive optical network with at least one optical amplification unit according to claim 6, wherein the amplification means is arranged between at least one optical network terminal and an optical line termination, and wherein the generation means is arranged at the location of the optical line termination or at the location of one of the optical network terminals.

10. An optical repeater with an optical amplification unit according to claim 6.

* * * * *